United States Patent
Delph

(10) Patent No.: US 6,356,934 B1
(45) Date of Patent: *Mar. 12, 2002

(54) INTERMEDIATE SERVER HAVING CONTROL PROGRAM FOR STORING CONTENT ACCESSED DURING BROWSING SESSIONS AND PLAYBACK PROGRAM FOR ASYNCHRONOUSLY REPLAYING BROWSING SESSIONS

(75) Inventor: Daniel C. Delph, Euless, TX (US)

(73) Assignee: Sabre Inc., Fort Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/840,329

(22) Filed: Apr. 28, 1997

(51) Int. Cl.[7] ............................................... G06F 15/16
(52) U.S. Cl. ...................................... 709/204; 709/246
(58) Field of Search .......... 395/200.33, 200.48–200.49, 395/200.76; 709/203, 218–219, 236, 246, 204–205; 345/329–332

(56) References Cited

U.S. PATENT DOCUMENTS

| | | | |
|---|---|---|---|
| 4,722,005 A | * 1/1988 | Ledenbach | 348/173 |
| 4,974,173 A | 11/1990 | Stefik et al. | 364/521 |
| 5,101,402 A | 3/1992 | Chiu et al. | 370/17 |
| 5,117,225 A | 5/1992 | Wang | 340/717 |
| 5,191,523 A | 3/1993 | Whitesage | |
| 5,220,655 A | 6/1993 | Tsutsui | 395/325 |
| 5,237,499 A | 8/1993 | Garback | |
| 5,241,625 A | 8/1993 | Epard et al. | 395/163 |
| 5,311,425 A | 5/1994 | Inada | |

(List continued on next page.)

FOREIGN PATENT DOCUMENTS

EP      0 753 836 A      1/1997

OTHER PUBLICATIONS

Dieberger, A., "Browsing the WWW by Interacting with a Textual Virtual Environment—A Framework for Experimenting with Navigational Metaphors," Proc. of Hypertext '96, ACM, pp. 170–179, Feb. 1996.*

(List continued on next page.)

*Primary Examiner*—Zarni Maung
*Assistant Examiner*—Andrew Caldwell
(74) *Attorney, Agent, or Firm*—Finnegan, Henderson, Farabow, Garrett & Dunner, L.L.P.

(57) ABSTRACT

An intermediate server for sharing data between a sender computer and receiver computer(s) is disclosed. A sender initiates a browsing session by (1) requesting a session setup form from the intermediate server that is returned with a beginning URL or (2) being redirected to the intermediate server. A intermediate server control program retrieves content from a server, modifies the hyperlinks within the content by appending the original URL to the URL of the intermediate server, stores the modified content data for later use, and forwards the modified content data to the sender. In asynchronous playback mode, a receiver connects to the intermediate server using a session identifier associated with sender's browsing session. An intermediate server playback program retrieves and pushes the stored content to the receiver. Storing the modified content guarantees that sender and receiver view the same content sequence as opposed to the same URL sequence.

19 Claims, 3 Drawing Sheets

U.S. PATENT DOCUMENTS

| | | | |
|---|---|---|---|
| 5,392,400 A | | 2/1995 | Berkowitz et al. .......... 395/200 |
| 5,440,699 A | * | 8/1995 | Farrand et al. ............. 345/329 |
| 5,467,268 A | | 11/1995 | Sisley et al. |
| 5,469,183 A | | 11/1995 | Takatsuji et al. ............... 345/2 |
| 5,500,929 A | | 3/1996 | Dickinson ................... 395/160 |
| 5,504,675 A | | 4/1996 | Cragun et al. .............. 364/401 |
| 5,508,713 A | | 4/1996 | Okouchi ........................ 345/1 |
| 5,530,852 A | | 6/1996 | Meske, Jr. et al. .......... 395/600 |
| 5,544,354 A | | 8/1996 | May et al. ................... 395/600 |
| 5,553,239 A | | 9/1996 | Heath et al. ............. 395/108.1 |
| 5,553,281 A | | 9/1996 | Brown et al. ................ 395/600 |
| 5,563,805 A | | 10/1996 | Arbuckle et al. ........... 364/514 |
| 5,570,283 A | | 10/1996 | Shoolery et al. |
| 5,572,643 A | | 11/1996 | Judson ........................ 395/793 |
| 5,577,254 A | | 11/1996 | Gilbert ........................ 395/615 |
| 5,577,258 A | | 11/1996 | Cruz et al. |
| 5,608,874 A | | 3/1997 | Ogawa |
| 5,696,898 A | * | 12/1997 | Baker et al. ........... 395/187.01 |
| 5,706,507 A | * | 1/1998 | Schloss ....................... 707/104 |
| 5,717,860 A | * | 2/1998 | Graber et al. .......... 395/200.57 |
| 5,724,355 A | * | 3/1998 | Bruno et al. ................. 370/401 |
| 5,727,159 A | * | 3/1998 | Kikinis .................. 395/200.76 |
| 5,734,719 A | | 3/1998 | Tsevdos et al. |
| 5,742,762 A | * | 4/1998 | Scholl et al. ............ 395/200.3 |
| 5,752,022 A | * | 5/1998 | Chiu et al. ..................... 707/10 |
| 5,754,830 A | * | 5/1998 | Butts et al. .................. 395/500 |
| 5,761,071 A | | 6/1998 | Bernstein et al. |
| 5,761,683 A | * | 6/1998 | Logan et al. ................ 707/513 |
| 5,774,660 A | | 6/1998 | Brendel et al. |
| 5,781,909 A | * | 7/1998 | Logan et al. ................ 707/200 |
| 5,801,689 A | * | 9/1998 | Huntsman .................... 345/329 |
| 5,809,247 A | * | 9/1998 | Richardson et al. ........ 709/218 |
| 5,819,084 A | * | 10/1998 | Shapiro ........................ 707/10 |
| 5,822,539 A | * | 10/1998 | Van Hoff .................... 709/230 |
| 5,832,454 A | | 11/1998 | Jafri et al. |
| 5,835,718 A | * | 11/1998 | Blewett ....................... 709/218 |
| 5,848,248 A | * | 12/1998 | Kawasaki et al. .......... 709/238 |
| 5,862,330 A | * | 1/1999 | Anupam et al. ............ 709/204 |
| 5,864,874 A | * | 1/1999 | Shapiro ....................... 707/201 |
| 5,870,546 A | * | 2/1999 | Kirsch ......................... 709/205 |
| 5,887,170 A | * | 3/1999 | Ansberry et al. ............ 709/302 |
| 5,909,545 A | * | 6/1999 | Frese, II et al. ............. 709/208 |
| 5,918,009 A | * | 6/1999 | Gehani et al. .............. 713/201 |
| 5,944,791 A | * | 8/1999 | Scherpbier .................. 709/218 |
| 5,956,027 A | * | 9/1999 | Krishnamurthy ............ 345/329 |
| 5,991,796 A | * | 11/1999 | Anupam et al. ............ 709/206 |
| 6,009,429 A | * | 12/1999 | Greer et al. ................... 707/10 |
| 6,034,652 A | * | 3/2000 | Freiberger et al. ............. 345/2 |
| 6,052,730 A | * | 4/2000 | Felciano et al. ............ 709/225 |
| 6,070,185 A | * | 5/2000 | Anupam et al. ............ 709/204 |
| 6,081,829 A | * | 6/2000 | Sidana ........................ 709/203 |
| 6,108,687 A | * | 8/2000 | Craig .......................... 709/203 |
| 6,119,167 A | * | 9/2000 | Boyle et al. ................. 709/234 |
| 6,151,622 A | * | 11/2000 | Fraenkel et al. ............ 709/205 |
| 6,195,694 B1 | * | 2/2001 | Chen et al. .................. 709/220 |
| 6,240,444 B1 | * | 5/2001 | Fin et al. ..................... 709/205 |
| 6,295,550 B1 | * | 9/2001 | Chuoung et al. ........... 709/204 |
| 6,295,551 B1 | * | 9/2001 | Roberts et al. .............. 709/205 |

OTHER PUBLICATIONS

Sinha, Pradeep K., "Distributed Operating Systems—Concepts and Design," IEEE Press, pp. 1–16, 1997.

"Synchronous Navigation Control For Distance Learning on the Web", Ping–Jer et al., Computer Networks and ISDN Systems, vol. 28, No. 11, May 1996, pp. 1207–1218.

"Filling HTML forms Simultaneously: CoWeb–Architecture and Functionality" Jacobs et al., Computer Networks and ISDN Systems, vol. 28, No. 11, May 1996, pp. 1385–1395.

"Extending WWW for Synchronous Collaboration", Frivold et al., Computer Networks and ISDN Systems, vol. 28, No. 1, Dec. 1995, pp. 69–75.

"Protect Your Company From a Net Loss of Productivity," (undated).

* cited by examiner

INTERMEDIATE SERVER HAVING CONTROL PROGRAM FOR STORING CONTENT ACCESSED DURING BROWSING SESSIONS AND PLAYBACK PROGRAM FOR ASYNCHRONOUSLY REPLAYING BROWSING SESSIONS

TECHNICAL FIELD OF THE INVENTION

The present invention relates generally to computer networks, and more particularly, to an apparatus and method for monitoring information received by a user of a network.

RELATED PATENT APPLICATIONS

This application is related to U.S. patent application Ser. No. 08/839,237, now U.S. Pat. No. 6,199,104, entitled "Server-Based Host Monitor," filed on Apr. 28, 1997, which is incorporated herein by reference as if fully set forth, and U.S. patent application Ser. No. 08/840,665, now U.S. Pat. No. 6,286,029, entitled "Server-Based Kiosk Controller," filed on Apr. 28, 1997, which is incorporated herein by reference as if fully set forth.

BACKGROUND OF THE INVENTION

In recent years, computer networks have grown very popular with computer users as a means of communicating and exchanging information. Such networks allow personal computer users to connect with each other, either directly or through a central communication point, and to exchange information by using a protocol common to each personal computer in each network. Corporations and businesses now commonly network computers used by their employees in "intranets," which are networks that have limited access to certain persons and/or computers. Such intranets are often protected by elaborate security systems or "firewalls" which prevent unauthorized users from accessing the intranet or retrieving internal intranet data. By contrast, the term "Internet" has been adopted to describe the publicly available network to which virtually every personal computer in the world has access. Recent improvements in the software available for accessing and searching the Internet have made the Internet a very popular source of information which can even be utilized by novices to computer technology.

Computers communicate on intranet and internet networks by the use of a common set of standards for exchanging data known as the Transmission Control Protocol/Internet Protocol ("TCP/IP"). To initiate communication on such a network, a user, known as a "client" contacts another computer on the network, known as the "server" or "host," by using various publicly available software programs. In public networks such as the Internet, these programs use various protocols to organize information in a manner which allows the user to locate and access files of interest to the user. For instance, some files are organized by a hierarchical menu system known as the "gopher." A user can search the Internet by linking from an Internet site of interest, or by entering the uniform resource locator ("URL") of the file on the gopher which the user wants to review.

The most popular and user-friendly protocol for organizing information on the Internet has become the World Wide Web (the "Www" or "Web"). The Web links information by associating items of interest through a common scripting language known as Hyper Text Markup Language ("HTML"), and transmits these HTML-based files between servers and clients using a common protocol known as the Hyper Text Transfer Protocol ("HTTP"). A Web user searches the Web by starting at the user's "home page," which is created and operated with HTML. From the home page, the Web user searches out and retrieves information by using "web browser" software. Web browsers allow a Web user to retrieve and render images and texts from files of interest to the user's computer. Web browsers operate by allowing a Web user to identify a "Web link" of interest on a Web page and then execute the Web link to transfer the computer data associated with the Web link from the server or host computer containing that data to the Web user's computer. Web links perform this transfer of computer data by communicating the URL of the desired file to the host.

The introduction of the Web with its easy-to-use browsers and the increasing availability of internet access service providers ("ISP's") have each led to an increase in the usage of the Internet because each has made the Internet easier to access and use. Despite these improvements, the Internet remains a technical environment which is often difficult for a user to navigate. Users can easily become lost in "cyberspace," making them frustrated and either unable or unwilling to use the Internet for commercial purposes. Accordingly, both users of the Internet and commercial businesses seeking to market goods and services through the Internet would benefit from any tool that makes the Internet easier to use and/or easier to learn to use. However, such universal tools are difficult to develop because of the wide array of hardware systems that access the Internet. In addition, the implementation of and instruction in such tools is difficult because Internet users are often geographically located a great distance apart, making face-to-face instruction impractical. This difficulty is compounded further by the variety of protocols and software available to access the Internet, and, when the user is accessing the Internet from an intranet, by the "firewall" security systems in place around intranets.

One means for assisting a network user is to post a phone number which the user can call with questions when the user accesses a particular network site. However, a network user who has become confused enough to call for help is also often too confused to explain the problem or problems he is experiencing. To overcome this difficulty, the person trying to help the confused user can access the same network site as the user. However, this only allows the helper to view what the confused user should be viewing, and does not necessarily render the same computer monitor screen display as is rendered on the confused user's monitor.

Known systems, often referred to as remote control systems, may allow a computer, referred to as a "client," to receive and render the same monitor screen data as is rendered by a separate computer, referred to as a "host;" however, such systems require additional software at the client and host computers, and also require compatibility between the client and host with respect to the hardware and/or software used by the client and host. Thus, in order to use these existing systems, the client and host must first exchange hardware and/or software data, as well as know each other's network address. In addition to being complicated, these systems require considerable processing by each computer and are thus slow in use. Further, these systems require protocols that are not commonly used on public networks such as the Internet. Thus, corporate intranets that allow access to the Internet through gopher and HTTP protocols may not allow unrecognized system-specific protocols associated with the existing systems to pass through their firewalls.

SUMMARY OF THE INVENTION

Therefore, a need has arisen for a universal tool which simplifies the use of networks and simplifies the process by which network users learn to navigate networks.

The present invention provides an apparatus and method for exchanging data between computers that is a powerful tool for using and teaching the use of networks in a simple and straightforward manner.

More specifically, the present invention allows a receiver computer to render the content data presented by a sender computer when the gender computer accesses a content server through an intermediate server. A control program loaded on the intermediate server directs the intermediate server to receive content data from the content server which the sender computer requested. The control program then directs the intermediate server to transfer the content data to the sender computer, thus allowing the sender computer to render the data which the sender computer would have rendered had it contacted the content server directly. Finally, the control program directs the intermediate server to transfer the content data to the receiver computer. The content data allows the receiver computer to render the same data that the sender computer has rendered.

The present invention provides an important technical advantage by allowing a receiver computer to render the same data rendered by a sender computer when that sender computer accesses a network through an intermediate server. This allows two geographically separated network users to simultaneously navigate a content server even if the network users have different types of computer systems and software. Further, the sender and receiver can use the present invention through an intermediate server's domain name without exchanging sender or receiver IP addresses. Further, the present invention enables transmission to take place even if both sender and receiver are behind firewalls which allow transmission of data through widely-accepted protocols such as the Hyper text Transport Protocol ("HTTP") and the File Transport Protocol ("FTP"), but which commonly prevent transmission of data using other less widely accepted protocols or proprietary protocols.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

The present invention uses the common protocol of a network to allow a receiver computer to receive the same data as a sender computer. The receiver computer and sender computers interface with an intermediate server through a network. A network is any means of transmitting data between computers, and generally entails the use of a common protocol. The intermediate server has a control program which directs the intermediate server to send selected data to the sender computer and the receiver computer. The selected data can be data that resides in the intermediate server or data which the intermediate server obtains from another computer interfaced with the network. When the data transmitted by the intermediate server comprises screen data, meaning data which causes a computer monitor to render a particular screen display, then both the sender computer and receiver computer have the ability to render an identical screen display.

Figure 1:
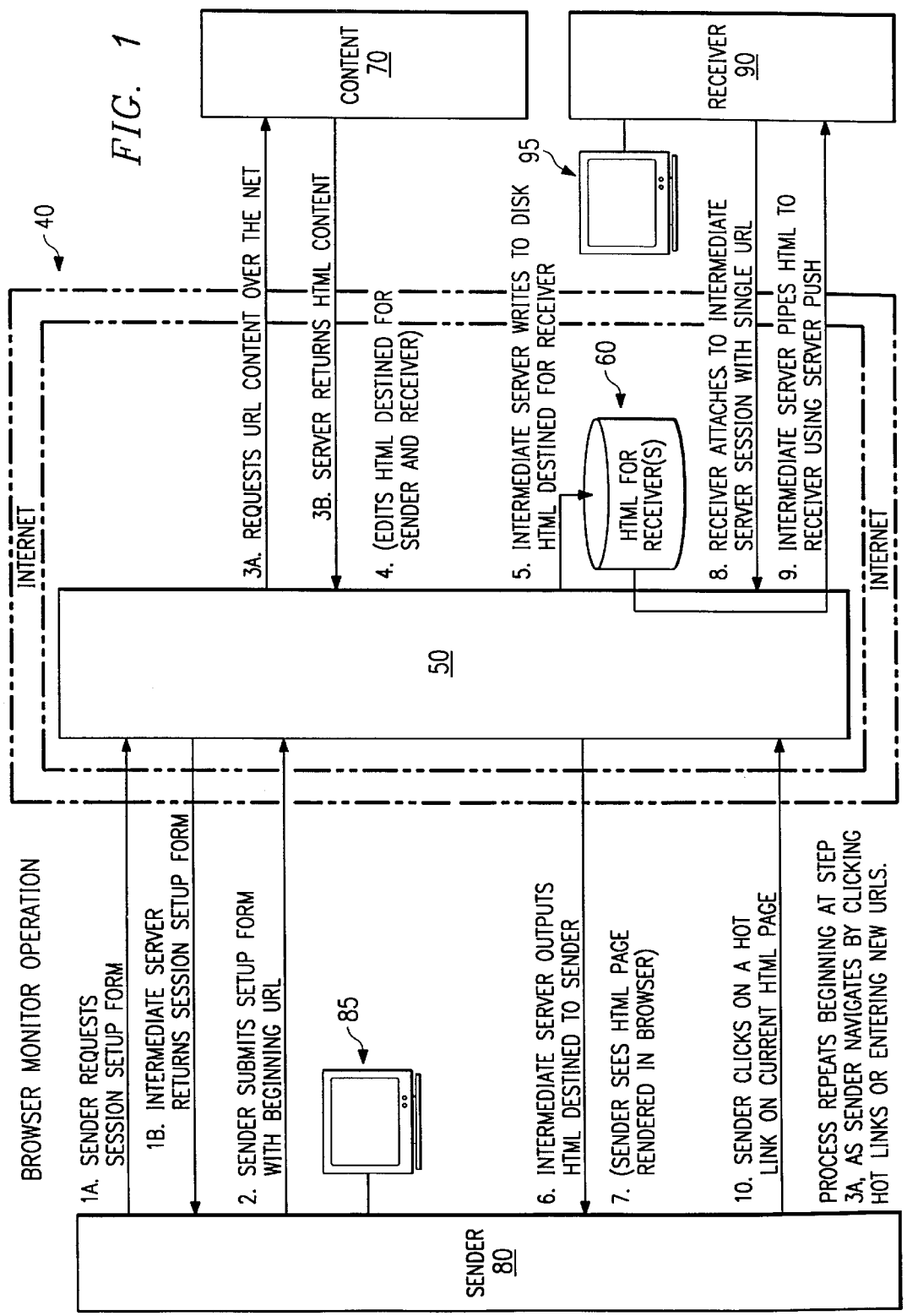
FIG. 1 shows a block diagram of the one embodiment of the present invention sharing content data between a sender and receiver computer through the Internet.

Referring now to FIG. 1, an embodiment of the present invention is depicted as interfaced with the Internet 40 by using the protocol of the World Wide Web. The term Internet as used herein refers to any network to which the public has access. Generally, a computer user can interface with the Internet through any telephone line or equivalent means of communication if the user's computer can implement TCP/IP or any other compatible protocol. Although FIG. 1 depicts the present invention's interaction with the Internet 40, it should be understood that the present invention can interact with an intranet in the same manner.

An intermediate server 50 interfaces with Internet 40 at a location code such as a domain name. Typically, servers that interface with any network have a processor, which operates the interface to the network, and at least one storage device. The interface itself is typically accomplished through a modem, although other means are available, such as ISDN or the high speed trunk lines which form part of the Internet. In one embodiment, the intermediate server has a processor with at least the capability of an Intel 386 processor, which is the minimum capability generally required to efficiently run the Web's HTTP protocol. The interface of this embodiment of the intermediate server 50 may be a modem, but any interface having the ability to receive input from at least two clients will suffice. The memory of this embodiment includes local RAM sufficient to run the HTTP protocol and a local storage device 60 which is a disk storage device having at least enough memory to store an HTML page, although an equal amount of RAM or other memory will also work. Numerous types of single storage devices having adequate size may serve as the storage device for intermediate server 50.

Content server 70 interfaces with the Internet 40 to make the content server 70 accessible to intermediate server 50. Any computer to which intermediate server 50 has access by a network may act as a content server for the present invention. This means that content server 70 should preferably include at least one interface, the ability to use a protocol common to intermediate server 50, and some content data of interest to a user stored in an accessible memory storage device at an identifiable location. In one embodiment, the content server contains a Web page stored in HTML at a URL.

Sender computer 80 and receiver computer 90 interface with Internet 40, to be accessible to intermediate server 50. Any computer which intermediate server 50 may access through a network may serve as either a sender computer or a receiver computer. Sender computer 80 and receiver computer 90 should each include at least one network interface and an ability to use a protocol in common with the intermediate server 50 protocol. In one embodiment, sender computer 80 and receiver computer 90 possess a processor with at least the capability of an Intel 386 processor, which is the minimum capability generally required to run the Web's HTTP protocol, and render a Web page upon a computer monitor screen. A sender computer monitor screen 85 renders screen data received by sender computer 80 in a viewable format, and a receiver computer monitor screen 95 renders screen data received by receiver computer 90 in a viewable format.

Steps 1–10 of FIG. 1 illustrate the operation of the intermediate server 50 for sharing data between sender computer 80 and receiver computer 90. In step 1*a*, sender computer 80 interfaces with intermediate server 50. An identification program loaded in the memory of intermediate server 50 directs intermediate server 50 to send a session setup form to sender computer 80, as is depicted in step 1*b*. In one embodiment, sender computer 80 interfaces with intermediate server 50 by using a standard Web browser, which retrieves the setup form and renders it on sender computer screen 85. A user can then input sender information to identify himself and to select content data stored at a content identification code which is of interest to him. As is depicted at step 2, a user can input the URL of the selected content data and send this URL to intermediate server 50. Other ways of identifying the selected content may also be used.

In step 3*a*, a control program loaded on intermediate server 50 directs intermediate server 50 to interface with the selected content server 70, and, as step 3*b* depicts, receive the data identified by the URL which the sender computer user originally input. For instance, if the user input a URL of http://www.content.interest.com into a Web browser, intermediate server 50 would receive this URL and act as an agent for the browser of sender computer 80 by contacting content server 70 and retrieving the HTML data located in the interest subdirectory.

At steps 4 and 5, when intermediate server 50 receives the selected content data, the control program directs it to store this data in local storage device 60 in unmodified form. The control program may then edit the data before storing the data on local storage device 60. For example, the control program can direct intermediate server 50 to edit HTML data by identifying the Web links within the data and modifying the Web links to point back to intermediate server 50 by appending the original Web link to the location code of intermediate server 50. At step 6, modified content data goes to sender computer 80 for its display on monitor screen 85. The display which screen 85 renders is identical to the display that sender computer 80 otherwise would render upon retrieving the data in unmodified form directly from content computer 70. An alternative embodiment may modify the content data so that the screen data remains the same, but the linking data changes into modified linking data that points back to intermediate server 50.

At step 8, a Web browser of receiver computer 90 interfaces with intermediate server 50, which the identification program directs to send a session connection form to receiver computer 90. The user of receiver computer 90 may then identify the sender he wishes to monitor by entering an identification code of the sender. In alternative embodiments, if the receiver knows the sender it wishes to monitor, he may bypass this connection process by entering a single identifier, such as a URL, which the identification program will recognize.

At step 9, the control program directs intermediate server 50 to send the unmodified data stored in local storage device 60 to receiver computer 90. In the preferred embodiment, the browser of receiver computer 90 renders the unmodified HTML content on receiver screen 95 but maintains the TCP/IP connection with intermediate server 50 by means of a server-push technique such as HTTP MIME Type Multipart/X-Mixed-Replace. A server-push technique is used with the Web protocol, since browsers possess the ability to disconnect an Internet interface with a particular server after the user retrieves requested data. An alternative embodiment may include alternative ways of pushing the content data to receiver computer 90.

After step 9, both sender screen 85 and receiver screen 95 render the same display, but the modified Web links that sender screen 85 display lead back to intermediate server 50, whereas the original, unmodified Web links on receiver screen 95 lead directly to the content server that has the identified data. The unmodified Web links direct the browser through intermediate server 50. Thus, if at step 10 the user of sender computer 80 activates a modified Web link, the control program directs intermediate server 50 to retrieve data at the URL corresponding to the original, unmodified Web link as set forth above starting at step 3*a*. The control program may then direct intermediate server 50 to retrieve, modify and transfer the data corresponding to the selected URL so that sender screen 85 and receiver screen 95 may each render the screen display associated with the selected data. Essentially, steps 3*a* through 10 of FIG. 1 repeat in order as the sender navigates through the Web, but step 8 is not repeated, thus allowing the receiver to monitor the sender without additional interaction on the part of the receiver. If, on the other hand, the user of receiver computer 90 activates an unmodified Web link, the browser of receiver computer 90 will go directly to the server associated with the Web link, thereby leaving its interface with intermediate server 50. In an alternative embodiment, receiver computer 90 may receive modified content that would disable all Web links to prevent receiver computer 90 from activating a Web link.

Figure 2:
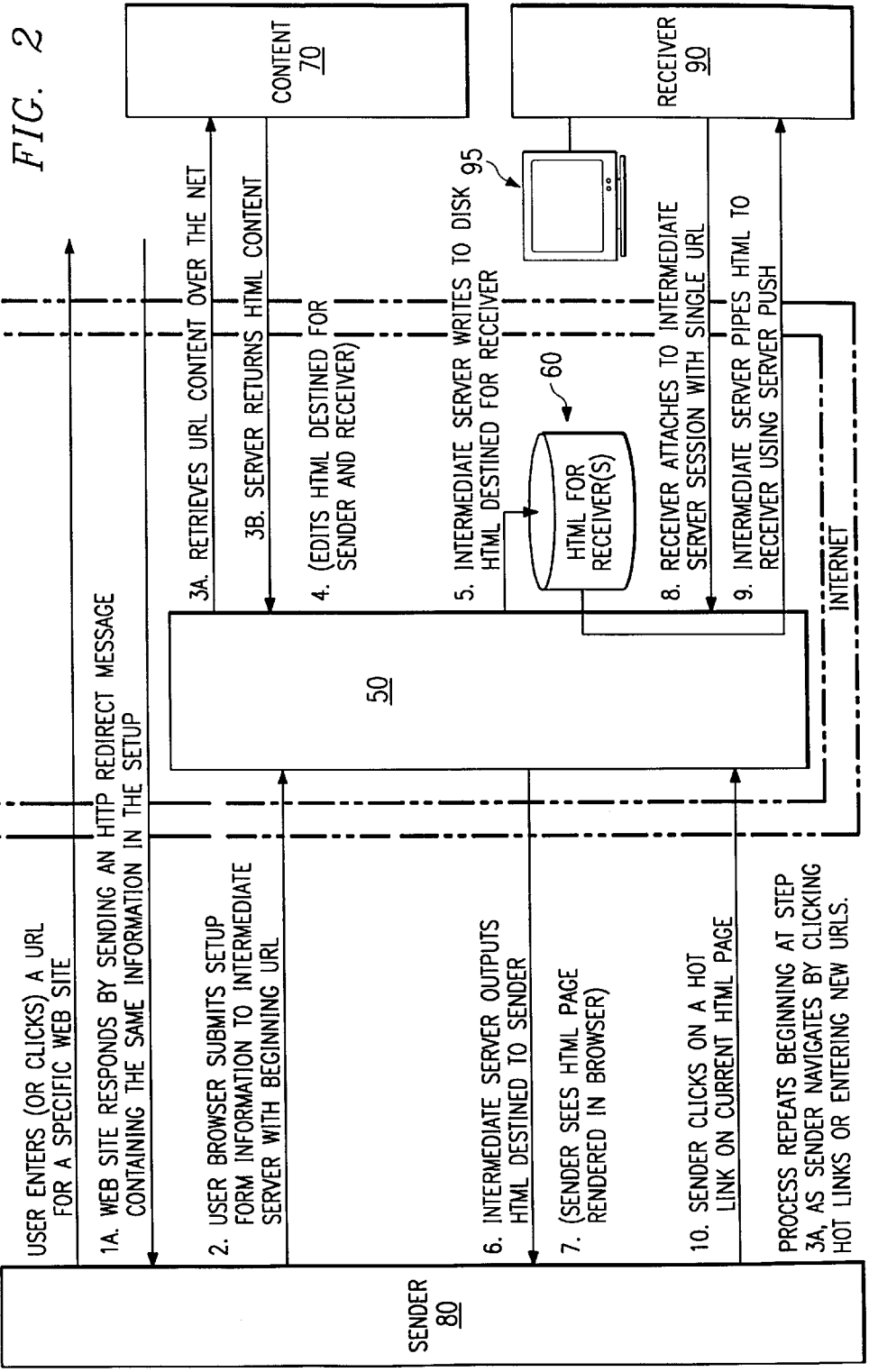
FIG. 2 shows a block diagram of one embodiment of the present invention interfaced with the sender computer through a re-direct program.

Referring now to FIG. 2, by using a re-direct program loaded on a content server, an intermediate server permits monitoring a user's navigation through a network without the user's initiation. Sender computer 80 interfaces with content server 70 through the Internet 40 by entering a content data identification code, such as a URL, for content data stored on content server 70. A re-direct program loaded on content server 70 directs content server 70 to provide sender computer 80 with a modified content data identification code which redirects sender computer 80 to intermediate server 50. Intermediate server 50 then contacts content server 70 as described in FIG. 1 at step 3*a*. The modified content data identification code comprises the unmodified code appended to the location code for intermediate server (50). Once sender computer 80 establishes an interface with intermediate server 50, the control program may direct intermediate server 50 to modify the data received by each content server navigated, even if the content servers being navigated do not include a re-direct program.

An example based on the Web protocol helps explain how the control program modifies identification information to point to an intermediate server having a domain name of intermediate.com. If an intermediate server, for example, retrieves data from a site having a URL of "http://travelexplorer.com/jamaica", the control program may modify the name of the site to "http://intermediate.com?http://travelexplorer.com/ jamaica". The control program may then search out and modify any Web links found in the data. For instance, a Web link of "http://travelexplorer.com/activity" found in the Jamaica subdirectory may be modified into "http://intermediate.com?http://travelexplorer.com/ activity." Appending the original Web link to the URL of the intermediate server the control program ensures that the sender computer's activation of the Web link may send the sender computer to the intermediate server, as well as provide the intermediate server with information of the next site which the sender computer wishes to navigate.

Although the embodiments herein are set forth in the context of the Internet as the network using the HTTP protocol of the Web, the present invention may allow a sender and receiver to share screen data in any network environment where the sender, receiver, content server and intermediate server interface using compatible network protocols. Thus, intranets operating with non-public protocols may include an intermediate server using the non-public protocol interfaced with the intranet.

Figure 3:
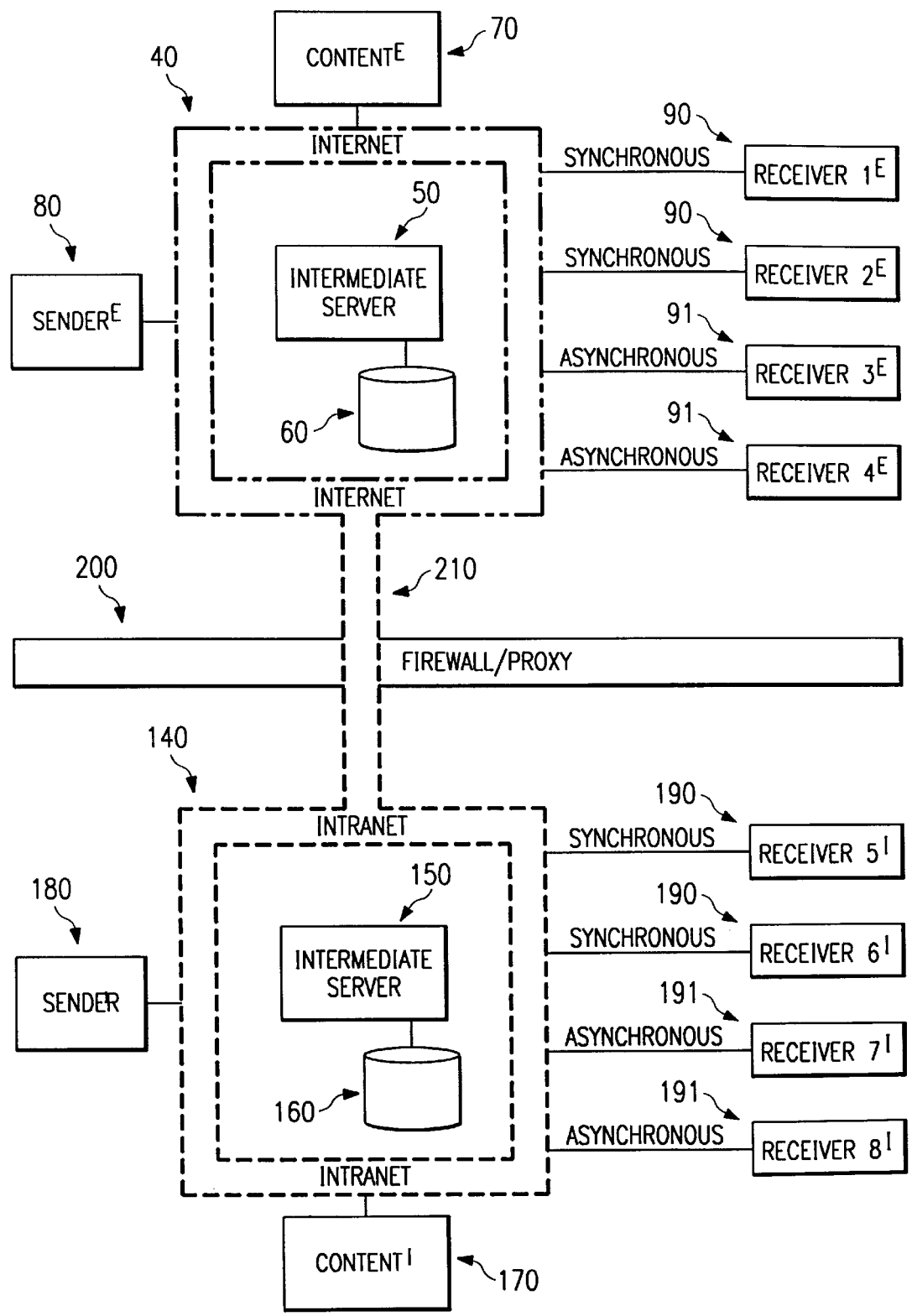
FIG. 3 shows different embodiments of the present invention, including the use of a tunnel across a corporate firewall.

FIG. 3 illustrates several alternate embodiments of the present invention. Intermediate server 150 having a local storage device 160 interfaces with an intranet 140. Sender computer 180 interfaces with intermediate server 150 to receive data from content server 170. A plurality of receiver computers 190 monitor sender computer 180 as sender computer 180 receives data from content server 170 in a synchronous mode. A plurality of receiver computers 191 monitor, in an asynchronous mode, data which sender computer already received but no longer display. The asynchronous mode involves a playback program for directing intermediate server 150 to retrieve data which local storage device 160 stores. The playback program permits transmitting the data to a single receiving computer or a plurality of receiver computers, even though sender computer 180 is not currently receiving this data.

Also illustrated in FIG. 3 is an intermediate server 50 having local storage device 60 and interfaced with the Internet 40. Sender computer 80 interfaces with Internet 40 and may use intermediate server 50 to receive data from content server 70 which interfaces with Internet 40. Receiver computers 90 share data in a synchronous mode with sender 80 through an interface with Internet 40. Receiver computers 91 are depicted sharing data in an asynchronous mode as a playback program directs intermediate server 50 to retrieve data stored in local storage device 60.

Firewall 200 protects intranet 140 from unauthorized access by computers or users outside the firewall 200. Firewall 200 maintains security by preventing outside computers or users from accessing resources and data on intranet 140. Thus, for instance, sender computer 180 could not use intermediate server 50 to share inside data with any receiver. However, sender computer 180 can share data with receiver computers outside the firewall if internal intermediate server 150 pushes the data through an HTTP tunnel 210 to external intermediate server 50, which receiver computer 90 can freely access.

In operation, the present invention may allow a confused network user to call a help desk having a computer that is interfaced with the user's network. The help desk directs the confused user to enter in a code, such as a URL or domain name, which sends the user's computer to an intermediate server. The help desk then contacts the intermediate server with an identification code specific to the confused user. The help desk, in this way, receives the same screen data as the confused user, allowing the help desk to aid the confused user in navigating through the network.

In a similar, commercial embodiment, a user contacts a sales desk instead of a help desk, and thereby obtains sales information and guidance to network sites having commercial opportunities. In this way, a sales person may answer questions and provide additional information about goods or services available through the network site or elsewhere. For instance, the sales person may act as a sender and lead the customer through the network sites of competitors to compare products or services. Later, if the customer wants to show a friend these goods and services, the customer may retrieve data using the playback program.

The re-direct program also has powerful commercial applications. The intermediate server monitors the navigation path of a network user and store the sites visited by the user. In this way the intermediate server gathers valuable marketing information about the navigation paths of users who visit a content site. Alternatively, parents can use the data saved on the intermediate server to determine the paths navigated by their children. Further, because the disclosed invention requires little additional computer processing, the user being monitored will not have a reduced access speed, and will have no indication of the monitoring.

Although the present invention has been described in detail, it should be understood that various changes, substitutions, and alterations can be made hereto without departing from the spirit and scope of the invention as described in the appended claims.

What is claimed is:

1. A method for sharing data between a sender computer and a receiver computer through a network, the method including the steps of:

establishing a communication session between an intermediate server and the sender computer;

sending a request for content data from the sender computer to the intermediate computer;

receiving content data that includes hyperlinks from a first content server;

storing the content data in the intermediate server;

modifying, by the intermediate server, the content data to create modified content data;

transferring the modified content data from the intermediate server to the sender computer;

establishing a communication session between the intermediate server and the receiver computer;

retrieving the content data stored in the intermediate server;

transferring the content data from the intermediate server to the receiver computer; and ending the communication session between the receiver computer and the intermediate server, in response to the receiver computer selecting a hyperlink in the content data.

2. The method of claim 1, wherein the modifying step further includes:

modifying the hyperlinks in the content data, wherein the modified hyperlinks lead the sender computer to the intermediate server when selected.

3. The method of claim 1 wherein the ending step further includes:

establishing a communication session directly between the receiver computer and a second content server associated with the hyperlink selected by the receiver computer.

4. A system for sharing data between a sender computer and a receiver computer through a network, the system comprising:

a sender computer interfaced with the network;

a first content server interfaced with the network, the content server providing content data that includes at least one hyperlink.

an intermediate server interfaced with the network, the intermediate server including a local storage device;

a control program loaded on the intermediate server, the control program operationally directing the intermediate server to:
  receive the content data from the content server;
  store the content data on the local storage device;
  modify the at least one hyperlink in the content data to create modified content data, wherein the modified hyperlink leads to the intermediate server when selected;
  transfer the modified content data to the sender computer;
a receiver computer that is operationally interfaced with the intermediate server;
a playback program loaded on the intermediate server, the playback program operating independently of the control program to direct the intermediate server to:
  retrieve the content data stored in the local storage device; and
  transfer the content data to the receiver computer;
wherein the transfer of the content data to the sender and receiver computers is performed independently in time and wherein the receiver computer leaves its interface with the intermediate server when the receiver computer selects a hyperlink in the content data.

5. The system of claim 4, further including a second content server that provides second content data and wherein the receiver computer establishes an operable interface with the second content server in response to the receiver computer selecting the hyperlink in the content data.

6. A method for sharing data between a sender computer and a receiver computer through a network, the method including the steps of:
  establishing a first communication session between an intermediate server and the sender computer, using a single session identifier;
  sending a request for content data from the sender computer to the intermediate computer receiving content data from a first content server;
  storing the content data in the intermediate server;
  modifying, by the intermediate server, the content data to create modified content data;
  transferring the modified content data from the intermediate server to the sender computer;
  establishing a second communication session between the intermediate server and the receiver computer using the single session identifier;
  retrieving the content data stored in the intermediate server;
  transferring the content data from the intermediate server to the receiver computer;
  ending the second communication session between the receiver computer and intermediate server; and
  establishing a third communication session between the receiver computer and a second content server, wherein the communication session between the intermediate server and the sender computer still exists when the communication session between the receiver computer and intermediate server is ended.

7. The method of claim 6, wherein the single session identifier uniquely identifies the sender computer's session with the intermediate server.

8. The method of claim 7, wherein the session identifier is used to connect to the intermediate server in order to establish the second communication session with the intermediate server, and
  wherein the intermediate server is configured to send a session form to each of the receiver computer and sender computer, respectively upon the sender and receiver computers establishing an initial communication with the intermediate server, and the intermediate server is configured to receive and utilize the single session identifier to locate the content data sent to the receiver computer, wherein the single session identifier enables the receiver computer to bypass receiving the session form from the intermediate server.

9. The method of claim 6, wherein the content data includes hyperlinks, and wherein the modifying step further includes:
  modifying the hyperlinks in the content data, wherein the modified hyperlinks lead the sender computer to the intermediate server when selected by the sender computer.

10. The method of claim 6, wherein the step of establishing a first communication session between the intermediate server and the sender computer further includes:
  using, by the sender computer, a URL to connect to the intermediate server;
  sending, by the intermediate server, a session form to the sender computer; and
  sending, by the sender computer, the session form back to the intermediate server, wherein the sender computer inserts session information in the session form prior to sending the session form to the intermediate server.

11. The method of claim 6, wherein the step of establishing a second communication session further includes:
  using, by the receiver computer, the session identifier to connect to the intermediate server; and
  using, by the intermediate server, the session identifier to locate the content data sent to the receiver computer.

12. A system for sharing data between a sender computer and a receiver computer through a network, the system comprising:
  a sender computer interfaced with the network;
  a content server interfaced with the network, the content server including content data;
  an intermediate server interfaced with the network, the intermediate server including a local storage device, wherein the sender computer establishes a first communication session with the intermediate computer through the network;
  a control program loaded on the intermediate server, the control program operationally directing the intermediate server to:
    receive content data from the content server;
    transfer the content data to the sender computer during the first communication session in a sequence; and
    store the content data on the local storage device, wherein the local storage device stores the content data in the sequence that the sender computer received the content data from the intermediate computer;
  a receiver computer that is operationally interfaced with the intermediate server through the network, wherein the receiver computer establishes a second communication session with the intermediate server after the first communication session has ended and using a single session identifier;
  a playback program loaded on the intermediate server, the playback program operating independently of the control program to direct the intermediate server to:
    retrieve the content data stored in the local storage device; and transfer the content data to the receiver computer during the second communication session;

wherein the receiver computer may receive the content data in the sequence that the sender computer previously received during the first communication session.

13. The system of claim 12, wherein the single session identifier is associated with the first communication session.

14. The system of claim 13, wherein the single session identifier is used by the receiver computer to connect to the intermediate server in order to establish the second communication session with the intermediate server, and wherein the intermediate server is configured to send a session form to each of the receiver computer and sender computer, respectively upon the sender and receiver computers establishing an initial communication with the intermediate server, and the intermediate server is configured to receive and utilize the single session identifier to locate the content data sent to the receiver computer, wherein the single session identifier enables the receiver computer to bypass receiving the session form from the intermediate server.

15. A method for sharing data between a sender computer and a receiver computer through a network, the method including the steps, performed by a program loaded on an intermediate server, of:

receiving content data from a content server;

transferring the content data to the sender computer in a sequence during a communication session established between the sender computer and the intermediate server;

storing the content data in the sequence on a local storage device;

retrieving the content data stored in the local storage device; and transferring the content data to a receiver computer, wherein the content data is transferred to the receiver computer after the communication session has ended and the receiver computer receives the sequence of content data that the sender computer previously received during the communication session previously established between the sender computer and the intermediate server.

16. The method of claim 15, wherein the receiver computer establishes a separate communication session with the intermediate server by using a single session identifier prior to receiving the content data, and wherein the single session identifier is associated with the communication session between the sender computer and the intermediate server.

17. The method of claim 16, wherein the intermediate server is configured to send a session form to each of the receiver computer and sender computer, respectively upon the sender and receiver computers establishing an initial communication with the intermediate server, the method further including:

using, by the receiver computer, the single session identifier to connect to the intermediate server; and using, by the intermediate server, the session identifier to locate the content data sent to the receiver computer, wherein the single session identifier enables the receiver computer to bypass receiving the session form from the intermediate server.

18. A system for sharing data between a sender computer and a plurality of receiver computers through a network, the system comprising:

an intermediate server interfaced with the network, the intermediate server including a local storage device;

a sender computer interfaced with the network, wherein the sender computer establishes a first communication session with the intermediate server;

a content server interfaced with the network, the content server including content data;

a plurality of receiver computers, wherein the plurality of receiver computers includes at least a first and second receiver computer, wherein the first and second receiver computers establish a second and third communication session with the intermediate server, respectively;

a control program loaded on the intermediate server, the control program operationally directing the intermediate server to:

receive the content data from the content server;

transfer the content data in a sequence to the sender computer during the first communication session;

store the content data in the sequence on the local storage device; and transfer the content data to the first receiver computer during the first and second communication sessions, wherein the first receiver computer receives the content data in the same sequence as the sender computer such that the sender and first receiver computers render the same content data simultaneously;

a playback program loaded on the intermediate server, the playback program operating independently of the control program to direct the intermediate server to:

retrieve the content data stored in the local storage device; and transfer the content data to the second receiver computer during the third communication session and after the first communication session has ended, wherein the second receiver computer receives content data in the same sequence that the sender computer previously received during the first communication session.

19. The system of claim 18, wherein the content data is transferred to the second receiver computer without user intervention at the second receiver computer.

* * * * *

UNITED STATES PATENT AND TRADEMARK OFFICE
CERTIFICATE OF CORRECTION

PATENT NO. : 6,356,934 B1
DATED : March 12, 2002
INVENTOR(S) : Daniel C. Delph

Page 1 of 1

It is certified that error appears in the above-identified patent and that said Letters Patent is hereby corrected as shown below:

Title page,
Item [57], ABSTRACT, line 2, "computer(s)is" should read -- computer(s) is --.

Column 8,
Line 65, "hyperlink." should read -- hyperlink; --.

Signed and Sealed this

Twenty-first Day of May, 2002

Attest:

Attesting Officer

JAMES E. ROGAN
Director of the United States Patent and Trademark Office